United States Patent [19]

Nogi et al.

[11] Patent Number: 5,522,357

[45] Date of Patent: Jun. 4, 1996

[54] APPARATUS AND METHOD OF FUEL INJECTION AND IGNITION OF INTERNAL COMBUSTION ENGINE

[75] Inventors: Toshiharu Nogi; Yoshishige Ohyama, both of Katsuta; Mamoru Fujieda, Tomobe-machi, all of Japan

[73] Assignee: Hitachi, Ltd., Tokyo, Japan

[21] Appl. No.: 230,258

[22] Filed: Apr. 20, 1994

[30] Foreign Application Priority Data

Apr. 20, 1993 [JP] Japan .................................... 5-092619

[51] Int. Cl.⁶ .......................... F02B 17/00; F02B 19/10
[52] U.S. Cl. .......................... 123/261; 123/293; 123/295; 123/305
[58] Field of Search .................. 123/260, 261, 123/275, 293, 295, 301, 305

[56] References Cited

U.S. PATENT DOCUMENTS

| | | | |
|---|---|---|---|
| 2,411,740 | 11/1946 | Malin | 123/295 |
| 2,412,821 | 12/1946 | Malin et al. | 123/295 |
| 2,448,950 | 9/1948 | Barber et al. | 123/295 |
| 2,484,009 | 10/1949 | Barber | 123/295 |
| 2,864,347 | 12/1958 | Barber et al. | 123/301 |
| 3,094,974 | 6/1963 | Barber | 123/263 X |
| 3,270,721 | 9/1966 | Hideg et al. | 123/269 X |
| 4,066,046 | 1/1978 | McAlister | 123/295 |
| 4,250,852 | 2/1981 | ogly Kerimov et al. | 123/261 X |
| 5,042,442 | 8/1991 | Laskaris et al. | 123/305 |
| 5,090,378 | 2/1992 | Gonzalez | 123/275 |

FOREIGN PATENT DOCUMENTS

| | | |
|---|---|---|
| 2321596 | 3/1977 | France . |
| 2930669 | 3/1981 | Germany ................ 123/261 |
| 2942294 | 4/1981 | Germany . |
| 730761 | 5/1955 | United Kingdom . |

Primary Examiner—Tony M. Argenbright
Attorney, Agent, or Firm—Antonelli, Terry, Stout & Kraus

[57] ABSTRACT

An injection port of a fuel injection valve is provided in the combustion chamber, an ignition source is provided in the vicinity of the injection port, a fuel-air mixture is ignited after fuel is injected from the fuel injection valve, and the energy of fuel jet flow is used so that the resulting flame may be carried on the fuel jet flow, thereby to elevate the penetration force, whereby the flame is dispersed in the combustion chamber.

14 Claims, 15 Drawing Sheets

APPARATUS AND METHOD OF FUEL INJECTION AND IGNITION OF INTERNAL COMBUSTION ENGINE

BACKGROUND OF THE INVENTION

The invention relates to an apparatus for fuel injection and ignition for use in an internal combustion engine which burns and converts fuel, such as gasoline, diesel fuel, natural gas, alcohol, hydrogen, etc., into power, and a method of operation thereof.

In internal combustion engines, in order to improve fuel consumption efficiency, it is necessary to form a lean fuel-air mixture which is low in fuel concentration, to increase thermal efficiency by providing a high compression ratio and to burn instantaneously the lean fuel-air mixture.

In FIGS. 2a to 2f, various kinds of conventional combustion methods of spark ignition in engines, such as gasoline engines, are illustrated in schematic diagrams of combustion conditions viewed from the upper side of the engine cylinder.

FIG. 2a shows a general case of engines, wherein a flame kernel is formed in a fuel-air mixture by a spark plug 3, and the flame is propagated in the circumferential direction to burn the fuel-air mixture. This combustion method has a defect in that the flame blows out midway in the combustion when the mixture of gas and air is lean. Further, the flame propagation is slow, and the thermal efficiency is low.

As measures against these defects, it is proposed to arrange a plurality of spark plugs in the cylinder, as shown in FIG. 2b; however, the arrangement of the spark plugs can not be optimized because of the presence of an intake valve and an exhaust valve (not shown).

Further, a method of forming ignition sources by mixing exhaust gas of high temperature into a fuel-air mixture is proposed, as shown in FIG. 2c. However, the positions of the ignition sources change with each engine cycle, so that the thermal efficiency is low.

On the other hand, there also is a method of promoting flame propagation by increasing the energy of a spark plug 3 to produce high temperature plasma and jetting it into a combustion chamber, as shown in FIG. 2d. However, the penetration force of the plasma is small, and the thermal efficiency is low.

Further, as for the plasma as shown in FIG. 2d, a method of forming an activated jet, as described in SAE Technical paper 910565 has been proposed; however, the force of the jet is small, and the jet is blown away by the flow of the fuel-air mixture, so that a sufficient effect has not been achieved with this method as yet.

Further, as shown in FIG. 2e, there is proposed a method of promoting flame propagation by providing an auxiliary chamber 22, burning a fuel-air mixture in the auxiliary chamber 22 using a spark plug 3, and jetting a torch flame into the combustion chamber 21. However, the surface area of the combustion chamber 21 is larger than the auxiliary chamber 22, so that thermal efficiency thereof is lowered.

On the other hand, as shown in FIG. 2f, a method of directly igniting fuel, sprayed by a fuel injection valve 2, using a spark plug 3 is proposed. However, mixing of the sprayed fuel and air is insufficient, so that there is a disadvantage that some soot is produced.

As mentioned above, the conventional combustion methods have defects in that the thermal efficiency is low and some soot is produced, irrespective of the kinds of fuel, such as gasoline, natural gas, hydrogen, alcohol, etc., being used.

Next, various kinds of conventional combustion methods used in auto-ignition engines, such as diesel engines, are illustrated in FIGS. 3a to 3f, each of which is a schematic diagram of combustion conditions viewed from an upper side of the engine cylinder.

FIG. 3a relates in general to diesel engines, wherein a spray of fuel from a fuel injection valve 2 is ignited by auto-ignition and flames are formed after a operation delay of ignition. For this time, some soot is produced when the mixing of the sprayed fuel and air is insufficient.

In order to eliminate this disadvantage, as shown in FIG. 3b, a method of promoting combustion by providing an auxiliary chamber 22 has been proposed. However, the surface area of the combustion chamber 21 is larger than that of the auxiliary chamber 22, and so the thermal efficiency is low.

Further, as shown in FIG. 3c, an attempt has been made to raise the pressure in a fuel injection valve 2 to 300 arm or more, to promote mixing of the air with gas and to prevent formation of soot. However, the timing of the auto-ignition is not fixed in each engine cycle and is not spatially consistent, so that the thermal efficiency is low.

Further, as shown in FIG. 3d, a method of promoting ignition of sprayed main fuel by injecting pilot fuel first to form a flame kernel has been proposed. However, the timing of formation of the flame kernel is not fixed in each engine cycle and spatially consistent, so that the thermal efficiency is low.

Further, as shown in FIG. 3e, a method of promoting combustion by providing a heater 23, such as a glow plug, has been proposed. However, the timing of the auto-ignition is not fixed in each engine cycle and is not spatially consistent, so that the thermal efficiency thereof is also low.

Furthermore, as shown in FIG. 3f, a method of igniting a fuel-air mixture by a flame produced in an auxiliary chamber or a nozzle has been proposed. However, the timing of the auto-ignition in the auxiliary chamber or the nozzle is not fixed in each engine cycle and is not spatially consistent, so that the thermal efficiency is low.

As mentioned above, in the conventional combustion methods as shown in FIGS. 2 and 3, except for the method as shown in FIG. 2b in which a plurality of spark plugs are employed, combustion is not fixed, but is changeable in each engine cycle and is not spatially consistent, so that the thermal efficiency is low.

Further, in the method shown in FIG. 2b, since it is difficult practically to position the plurality of plugs because of the presence of an intake valve and an exhaust valve, it is impossible to arrange the plugs in optimum positions, and as a result, the conventional method has the disadvantage that the thermal efficiency is low.

SUMMARY OF THE INVENTION

If a plurality of stable ignition sources are formed at various positions in a space within a combustion chamber, it is possible to effect instantaneous and spatially uniform combustion in the combustion chamber, so that a change occurring spatially and in each engine cycle can be decreased, and as a result, its thermal efficiency can be raised.

However, as mentioned above, since there are an intake valve and an exhaust valve, to contend with it is difficult in practice to arrange a plurality of plugs at optimum positions, so that it is necessary to disperse instantaneously flame kernels to various positions in the space within the combustion chamber.

In the above-mentioned methods, the methods (FIG. 2d, 2f, FIG. 3b) of blowing flame into the combustion chamber to disperse it, or the methods (FIG. 3c, 3d, 3f) of self-igniting after dispersion of jet flow are used. However, in the former, the penetration force of the flame is weak, and in the latter, there are the spatial change and the change in ignition timing in each engine cycle to contend with. As a result, the thermal efficiency can not be raised.

An object of the invention is to provide an apparatus and a method, each of which is able to reduce a change occurring in each combustion cycle and spatially, which is a drawback in the prior methods, without using a plurality of plugs, to raise its thermal efficiency as a result, and to burn instantaneously a lean fuel-air mixture in the cylinder.

In order to solve the problems of the above-mentioned prior methods, in accordance with the present invention, an injection port of a fuel injection valve is provided within a combustion chamber of the engine, an ignition source is formed at the periphery of the injection port, a fuel-air mixture is ignited for the duration of injection of fuel from the fuel injection valve, and the energy of the fuel jet flow is utilized so that the formed flame is carried on the fuel jet flow to increase the penetration force of the flame, whereby the flame is dispersed in the combustion chamber.

Further, in case a nozzle is provided on the injection port of the fuel injection valve, the diameter of an opening part of the nozzle is 1 mm or more.

Fuel is injected from the fuel injection valve, the spark plug is discharged to ignite the fuel-air mixture after the fuel-air mixture is formed in the combustion chamber, and a flame is formed. Since the fuel injection continues, the passing through force of the flame is increased by the energy of the fuel jet flow, the flame runs all over the inside of the combustion chamber, and the fuel-air mixture is surely burned. Since the fuel-air mixture which fills the inside of the combustion chamber can be combusted rapidly, the combustion is stabilized, and a change occurring in each combustion cycle and spatially can be decreased without using a plurality of spark plugs. As a result, the compression ratio can be raised, the thermal efficiency is improved and even lean a fuel-air mixture can be combusted instantaneously.

Further, when the scale of the flame kernel becomes 1 mm or more, the amount of heat generation accompanied by combustion of the fuel-air mixture in the surroundings of the flame kernel becomes larger than the heat dissipation amount to the surroundings due to heat transmission, and so the flame kernel grows and is not extinguished. Accordingly, when a nozzle is provided on the injection port of the fuel injection valve and diameter of the opening portion of the nozzle is made 1 mm or more, the scale of the flame kernel is made 1 mm or more to expand the flame kernel, and so the extinction thereof can be prevented.

DESCRIPTION OF THE EMBODIMENTS

Figure 4:
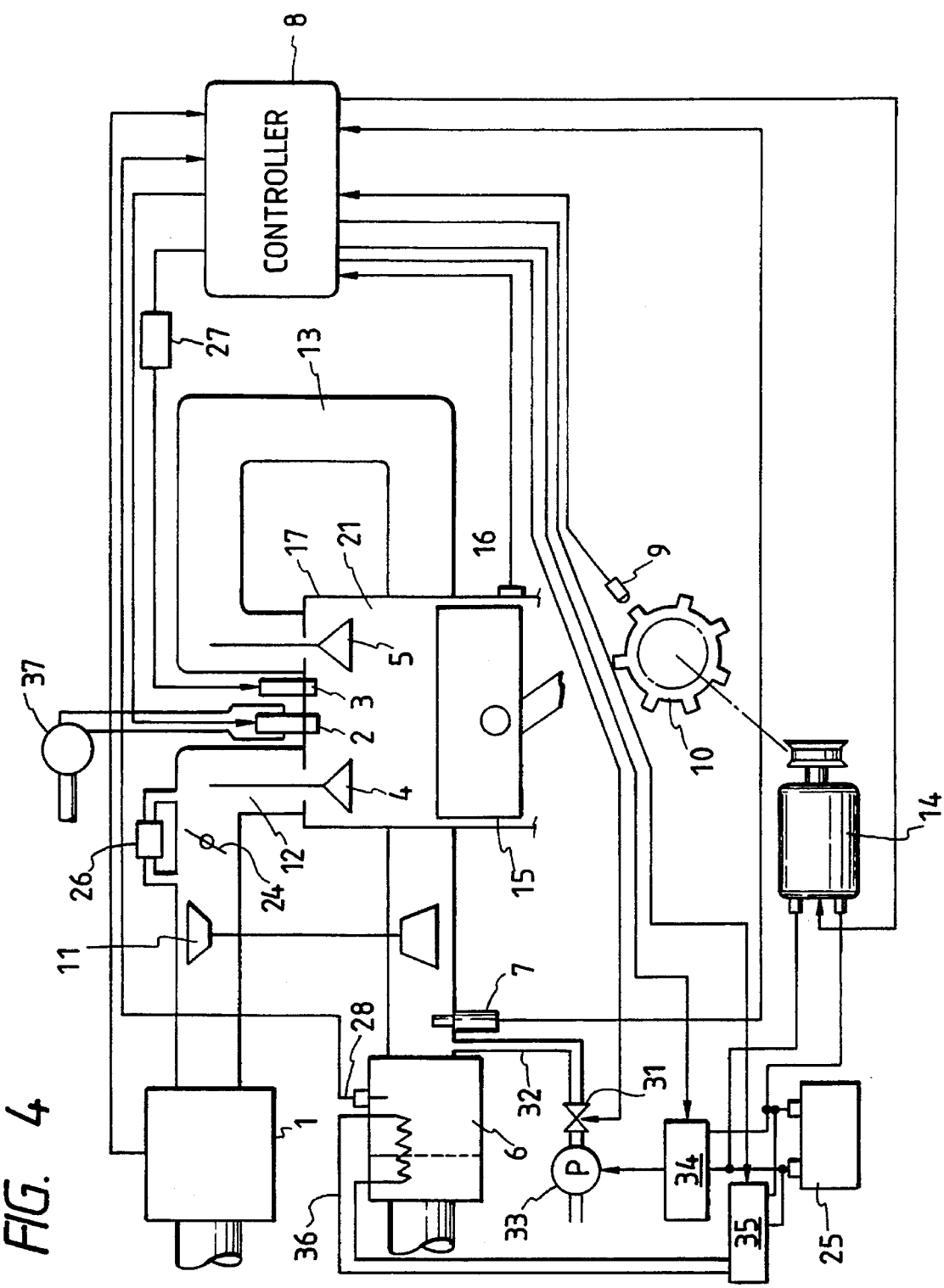
FIG. 4 is a block diagram of a control system of the engine, showing the first embodiment of the invention.

A first embodiment of the present invention is explained using FIGS. 1 and 4 to 10b. FIG. 4 is a block diagram showing an engine control system in which the present invention is employed. In FIG. 4, electric sources for operating an air flow meter 1, a fuel injection valve 2, a controller 8, an idling rpm control valve 26, an igniter 27, an air pump 33, a heater 36, a fuel pump 37 are supplied by a generator 14 and a battery 25. An amount of intake air controlled by a throttle valve 24, the idling rpm control valve 26 and a supercharger 11 is measured by the air flow meter 1 mounted on an intake pipe 12. Engine rpm is detected by a crank angle sensor 9. An amount of fuel is determined in the controller 8 according to the intake air amount and the engine rpm, and the fuel is directly injected into a combustion chamber 21 of each engine cylinder. Therefore, the fuel does not adhere to an inside wall of the intake pipe 12 and the intake valve 4, and unburnt fuel does not remain, whereby the control precision of the fuel amount is improved.

Ignition timing of a fuel-air mixture is calculated in the controller 8 using information from the air flow meter 1, an air-fuel ratio sensor 7, the crank angle sensor 9, a knocking sensor 16, etc., an operation signal is transmitted to the igniter 27, and the fuel-air mixture in the combustion chamber 21 of the cylinder is ignited by an spark plug 3.

A catalytic converter 6, which has a function to oxidize CO, HC and to reduce NOx in an oxidation atmosphere, is arranged in an exhaust pipe 13, whereby NOx can be reduced even if oxygen remains in the exhaust gas in case of lean combustion. An air-fuel ratio of the exhaust gas is detected by the air-fuel ratio sensor 7 mounted in the exhaust pipe 13, and whether or not the ratio is a target air fuel ratio is examined by the controller 8. If it is leaner than the target air fuel ratio, the fuel amount injected from the fuel injection valve 2 is increased. Further, in case the catalyzer temperature is low, such as in the case of the engine immediately after starting thereof, and the catalytic function is insufficient, the catalyst temperature is detected by a temperature sensor 28, and the heater 36 is operated by a heater controller 35, whereby the catalyst can be heated to a temperature at which the catalyst functions.

Further, since the operation of the catalyst also is influenced by the oxygen concentration, air can be pressurized and sent by the air pump 33 via an air introduction passage 32 at an inlet of the catalytic converter 6 by opening a control valve 31 and operating an air pump controller 34.

Figure 1:
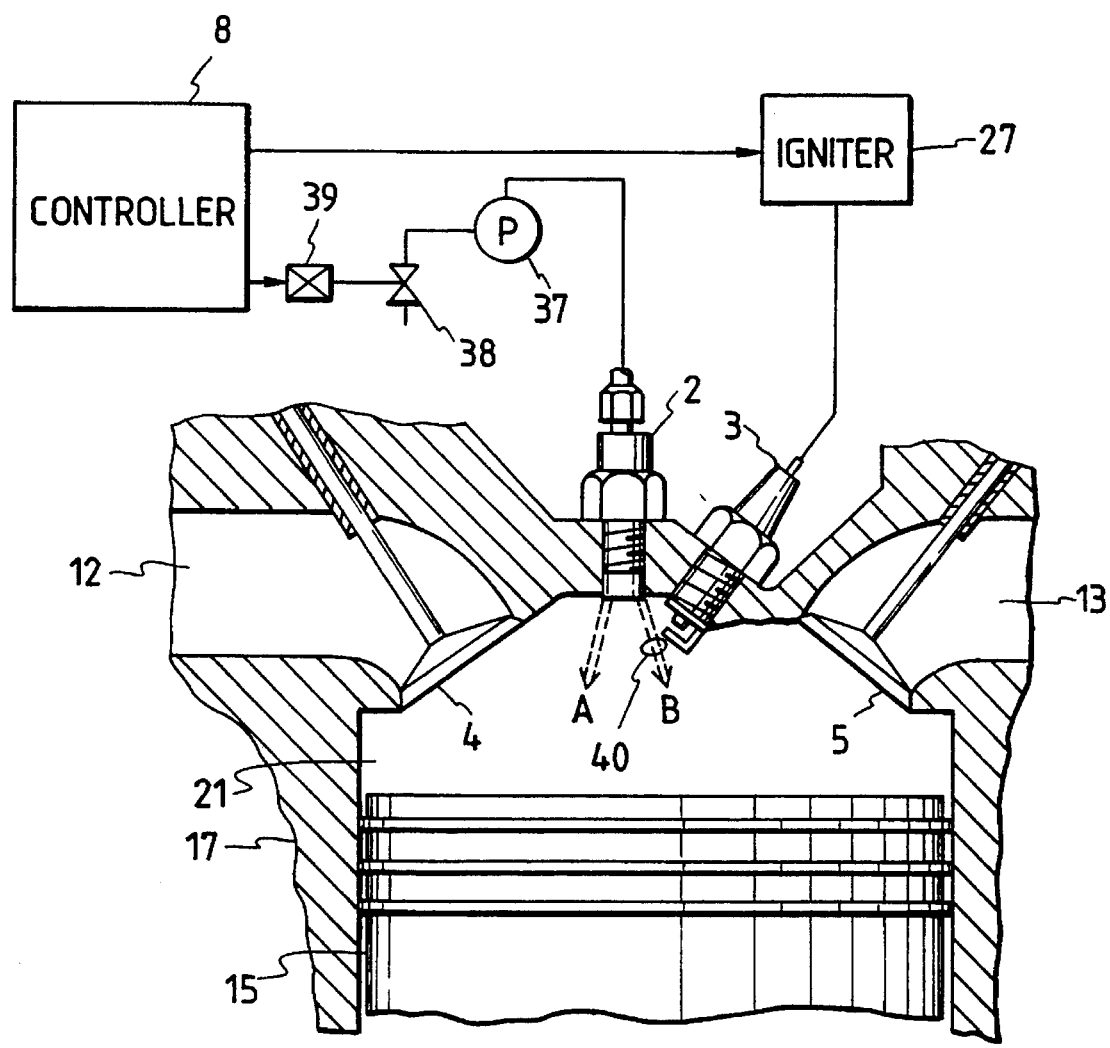
FIG. 1 is a vertical sectional view of a combustion chamber of an upper portion of one cylinder of an engine, showing a first embodiment of the invention.

FIG. 1 is a vertical sectional view of the combustion chamber 21 of an upper portion formed in one of the cylinders of the engine. A piston 15 is arranged in the combustion chamber 21 of the cylinder 17, and the intake valve 4, an exhaust valve 5, the fuel injection valve 2 and the spark plug 3 are mounted on the upper portion of the cylinder. The fuel injection valve 2 and the fuel pump 37 are connected by a piping, a spill valve 38 is mounted between the fuel pump 37 and a fuel tank (not shown). The operation of the spill valve 38 and the ignition timing are electrically controlled by the controller 8 through a spill valve controller 39 and the igniter 27. The pressure of fuel increases upon operation of the fuel pump 37, the fuel is injected as a jet flow A and a jet flow B upon opening of the fuel injection valve 2, and a fuel-air mixture is formed in the combustion chamber 21. Then, the spark plug 3 is ignited, and the fuel-air mixture around the jet flow B is combusted, whereby a flame kernel 40 of high temperature gas is formed. At this time, since the injection of the jet flow B continues, the flame kernel 40 is carried on the jet flow B and is, dispersed in the combustion chamber 21 to become an ignition source for the fuel-air mixture, and a fuel-air mixture, which is formed in the combustion chamber 21 in advance, is combusted instantaneously. Next, at the time when the flame kernel 40 is dispersed in the combustion chamber 21, the spill valve is opened, the pressure of fuel produced by the fuel pump 37 is decreased and the fuel injection from the fuel injection valve 2 is ended.

Figure 5:
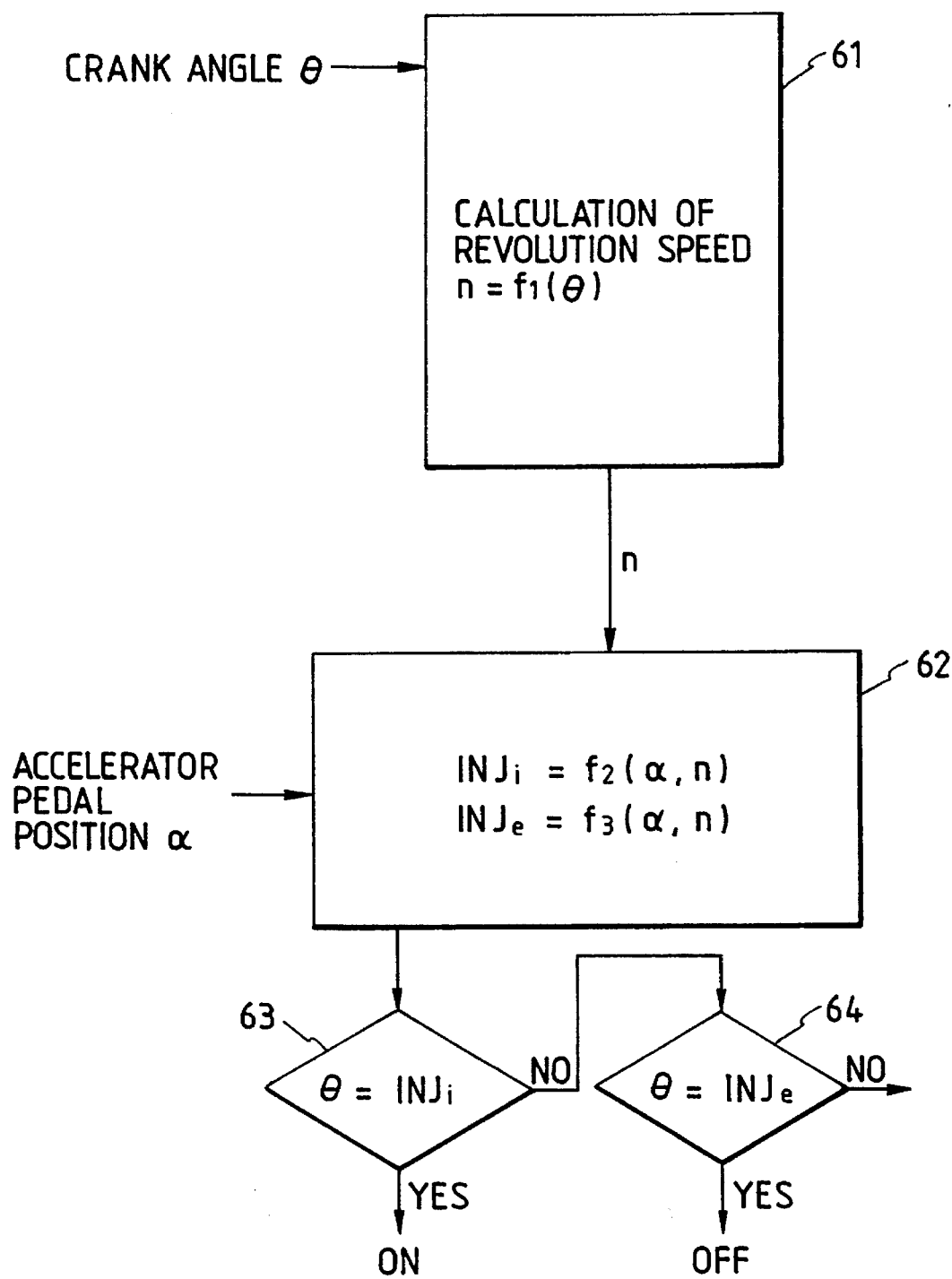
FIG. 5 is a flow chart of control concerning an operation of a fuel injection valve 2 executed in a controller 8.
Figure 6:
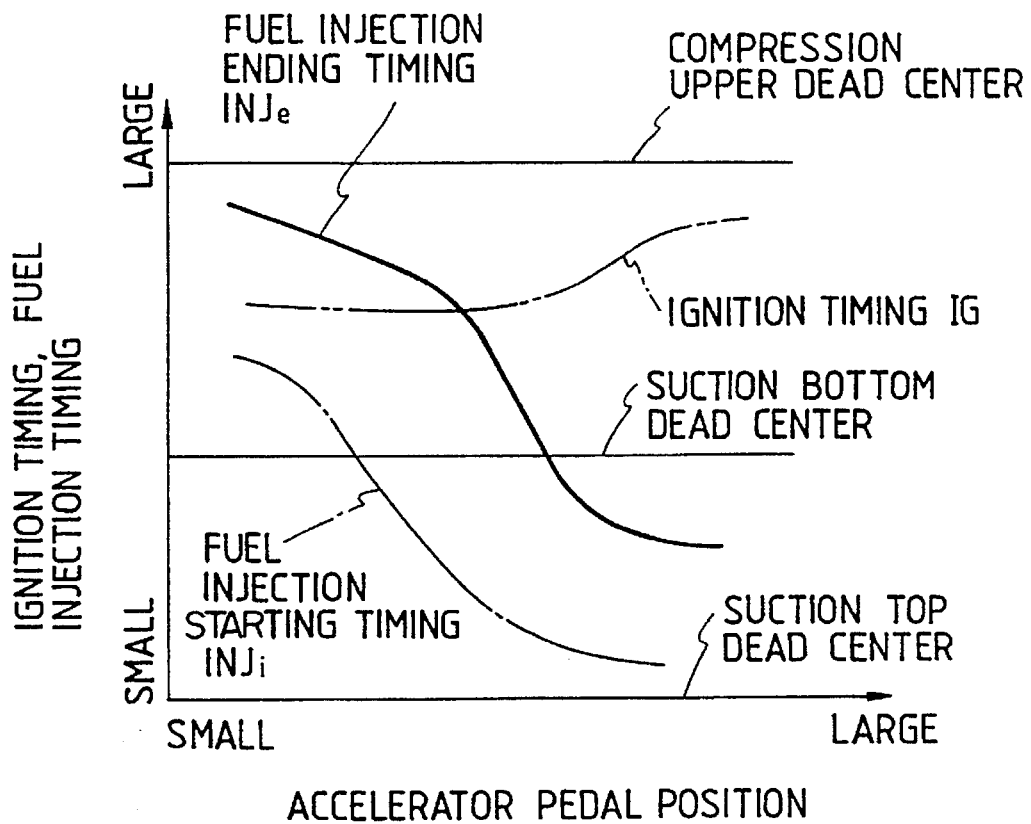
FIG. 6 is a diagram showing relationships among ignition timing, fuel injection timing and the position of an accelerator pedal.

FIG. 5 is a flow chart of control concerning the operation of the fuel injection valve 2 effected in the controller 8. In step 61, the engine rpm n is calculated on the basis of a crank angle signal θ of the engine, and then, in step 62, fuel injection start timing INJi and fuel injection ending timing INJe are obtained as functions of the rpm n and the position α of an accelerator pedal, using a previously memorized function, respectively. Next, in the judgement obtained in step 63, when the crank angle signal θ agrees with the fuel injection starting timing INJi, the fuel injection valve operation signal ON is sent to the fuel injection valve 2' and, in the judgement in step 64, when the crank angle signal θ coincides with the fuel injection ending timing INJe, an OFF signal is sent to the fuel injection valve 2. As a result, fuel is injected into the combustion chamber 21 for a determined injection period. The injection timing at each accelerator pedal position α is set as shown in FIG. 6, for example. In a time of small load, when the accelerator pedal position α is small, the injection timing is located around an upper dead center in the compression stroke, and the spark plug 3 is ignited before the fuel is dispersed widely in the combustion chamber to ignite the fuel-air mixture.

Figure 7:
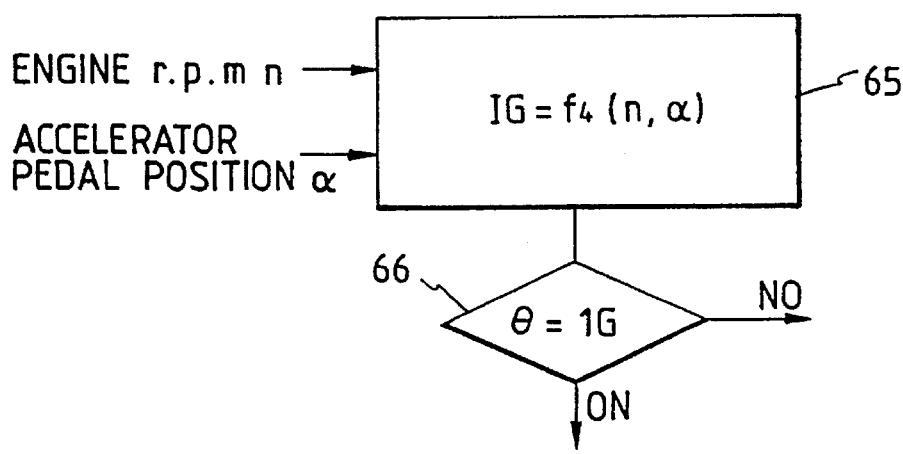
FIG. 7 is a flow chart of control concerning an operation of an igniter.

FIG. 7 is a flow chart of control operations concerning the operation of the igniter 27 effected in the controller 8. The ignition timing IG, given as a function of the engine rpm n and the accelerator pedal position α, as shown in step 65 in FIG. 7, is calculated in the controller 8. As shown in step 66, when the crank angle signal θ coincides with the ignition timing IG, an operation signal is sent to the ignitor 27, and the spark plug 3 is ignited. The ignition timing IG is set as in FIG. 6, for example, with respect to the accelerator pedal position α. In the time of a small load when the accelerator pedal position α is small, ignition is effected before the fuel injection ending timing INJe. The fuel-air mixture around the jet flow B, as shown in FIG. 1, is combusted to form the flame kernel 40, and the fuel injection energy after that is utilized to disperse the flame kernel 40 in the combustion chamber 21 and form a plurality of ignition sources in the space, thereby to combust the fuel-air mixture. As a result, even a lean fuel-air mixture; which has a large air-fuel ratio, can be combusted completely.

On the other hand, as shown in FIG. 6, as the value of the accelerator pedal position α becomes larger, the engine rpm n becomes larger and the fuel injection starting time INJi becomes earlier, so that the ignition timing IG is delayed as compared with the fuel injection ending timing INJe. Therefore, since the flame kernel 40 is not dispersed utilizing injection energy, an increase in vibrations of the whole engine and noises due to rapid combustion, which are apt to occur at high rpm operation of the engine, can be prevented.

Figure 8:
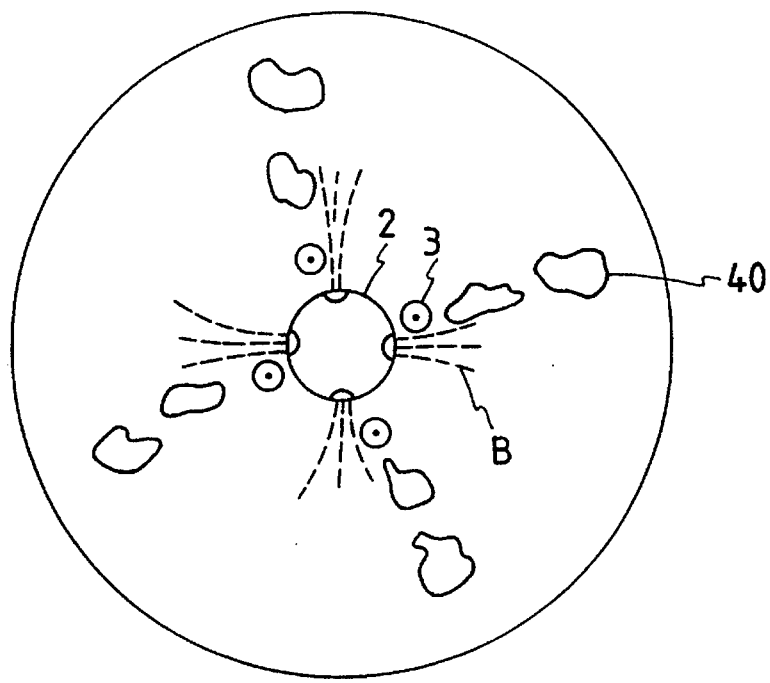
FIG. 8 is a schematic diagram of combustion conditions that occur inside of the combustion chamber 21, as viewed from an upper side of the chamber.

In FIG. 8, the combustion conditions as viewed from an upper side of the inside of the combustion chamber 21 are illustrated diagrammatically. There are shown conditions, wherein the spark plug 3 is provided around the jet flow B, the spark plug 3 continues to discharge, and the flame kernel 40 is dispersed by utilizing energy of the jet flow B from the fuel injection valve 2.

Figure 9:
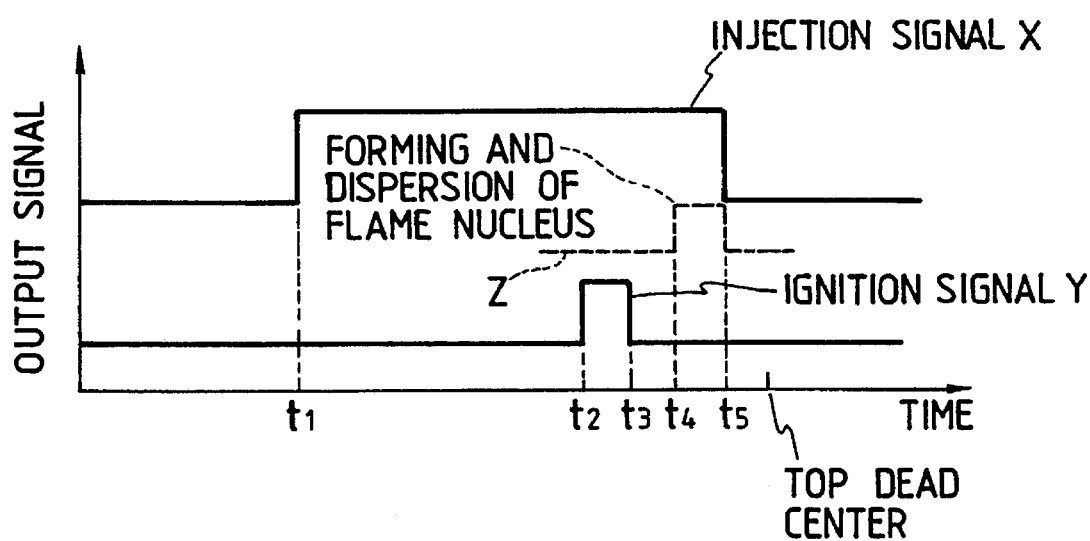
FIG. 9 is a time chart showing the timing of fuel injection and ignition.

In FIG. 9, a time chart showing the timing of fuel injection and ignition. In FIG. 9, fuel injection from the fuel injection valve 2 is continued until a time t5 from a time t1 before the upper dead center in the compression stroke, as shown by a injection signal (X); and, the spark plug 3 is discharged until time t3 from time t2 in the time that fuel-air mixture is formed, as shown by an ignition signal (Y), to ignite the mixture. Flame kernel 40 is formed by igniting the fuel, as shown by the (Z) line, and the flame kernels 40 are dispersed in the combustion chamber between time t4 and time t5. Then, the mixture in the combustion chamber 21 is ignited by the flame kernels 40, and burns. As mentioned above, the dispersion speed of the flame kernels 40 is faster than the flame propagation speed in conventional engines, so that the mixture burns instantaneously and the thermal efficiency is improved.

Figure 10A:
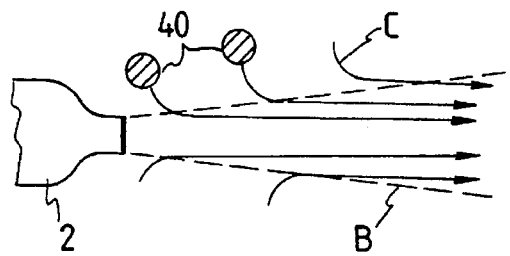
FIGS. 10a and 10b each are a schematic diagram of a flame.
Figure 10B:
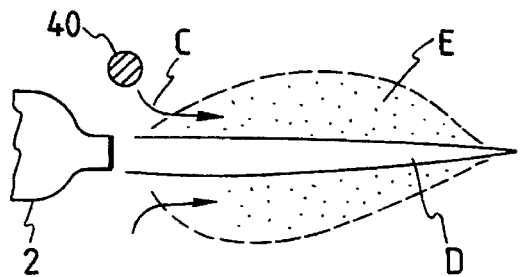

When the temperature of the flame kernels 40 lowers in the process of dispersion of the flame kernels 40, they can not ignite the fuel-air mixture. In order to prevent this phenomenon and maintain the high temperature of the flame kernels 40, it is necessary that the amount of heat generation is more than the amount of heat dissipation. As shown in FIG. 10a, secondary flows C are formed by the jet flow B from the fuel injection valve 2, and the flame kernels 40 are carried on the secondary flows C and dispersed. At this time, the jet flow B comprises a core portion D of the jet flow and a particle suspension area E which surrounds the portion D and in which fuel particles are suspended, as shown in FIG. 10b. The flame kernels 40 are taken in the particles, when they disperse through the particle suspension area E, to maintain the amount of the heat generation at a level higher than the heat dissipation amount by burning them, and extinction of the flame kernels 40 thereby can be avoided.

Figure 11:
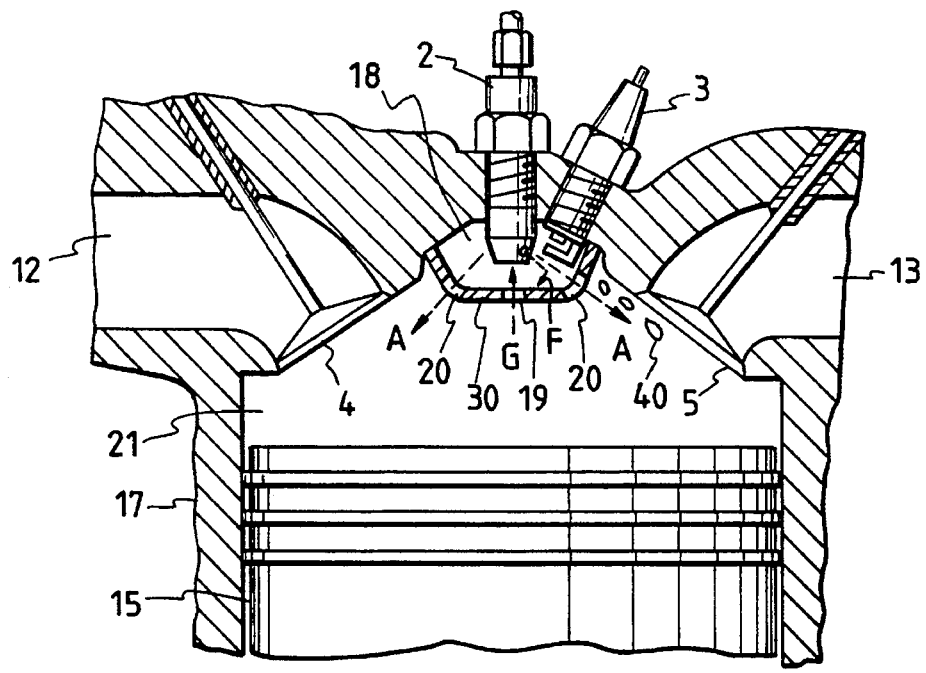
FIG. 11 is a vertical sectional view of a combustion chamber formed in an upper portion of one cylinder of an engine, showing a second embodiment of the invention.
Figure 12A:
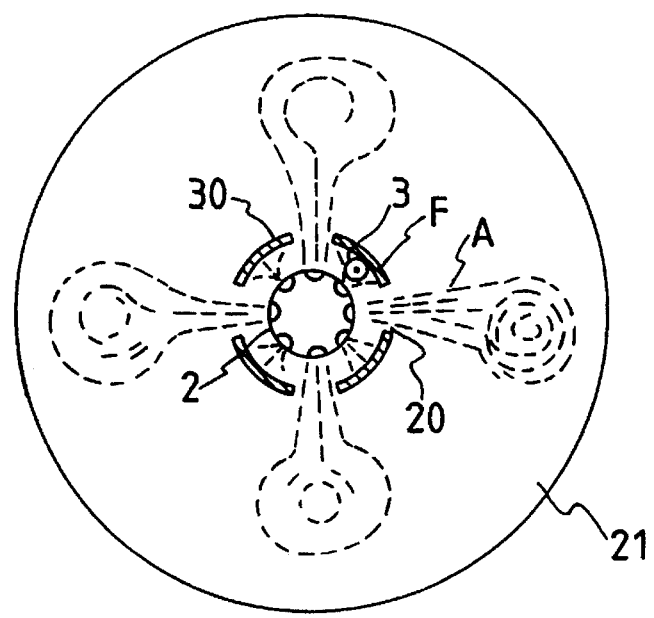
FIGS. 12a and 12b each are a schematic diagram of combustion conditions that occur inside of the combustion chamber 21, as viewed from an upper side of the chamber.
Figure 12B:
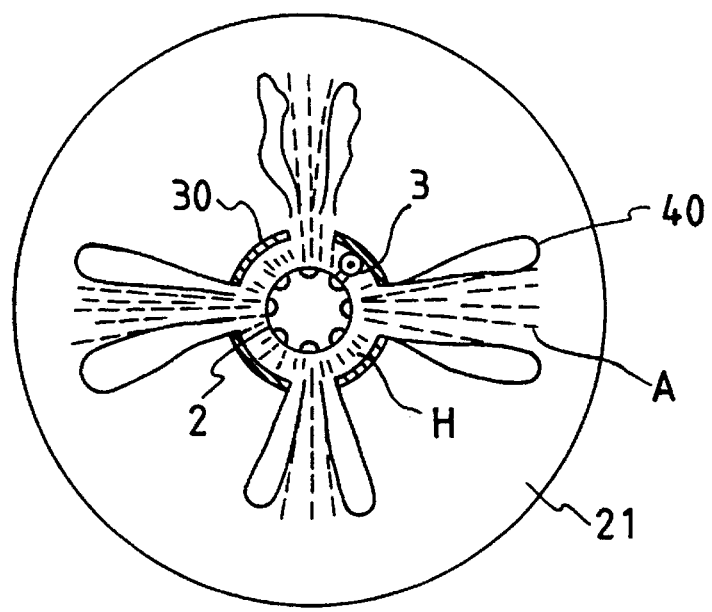

FIGS. 11, 12a and 12b show a second embodiment of the invention. FIG. 11 is a vertical sectional view of a combustion chamber 21 formed in the upper portion of one cylinder 17 of the engine, and it is similar to FIG. 1. The combustion chamber 21 and a piston 15 are arranged inside the cylinder 17. An intake valve 4 and an exhaust valve 5 are arranged at an upper portion of the combustion chamber 21 to open and close an intake pipe 12 and an exhaust pipe 13, respectively. An injection port of the fuel injection valve 2 and an electrode of a spark plug 3 are arranged in a chamber 18 inside a flame nozzle 30 having holes 19, 20. Further, FIGS. 12a and 12b each are a schematic diagram of combustion conditions viewed from an upper side of the inside of the combustion chamber 21.

An operation of the embodiment illustrated in FIGS. 11, 12a and 12b is described hereunder. In FIGS. 11 and 12a, jet flows A of fuel injected from the fuel injection valve 2 are supplied directly to the inside of the combustion chamber 21 through the holes 20 of the flame nozzle 30, and a fuel-air mixture is formed in the combustion chamber 21. A jet flow F can not pass through the hole 20 and stays within the chamber 18. On the other hand, fresh air G in the combustion chamber 21 enters the chamber 18 through the hole 19 through which the jet flows A of the flame nozzle 30 do not pass, which is because of the pressure in the chamber 18 being lower than that in the combustion chamber 21.

A fuel-air mixture, which is able to be ignited, is formed in the chamber 18 by the air G introduced here and the jet flow F of the above-mentioned fuel. At this time, the spark plug 3 is ignited, the fuel-air mixture within the chamber 18 is burned to produce high temperature combustion gas H, as shown in FIG. 12b. At this time, since the jet flows A continue to flow and the high temperature combustion gas H can not flow out at a stroke toward the combustion chamber 21, the gas is torn by the jet flows A, whereby a plurality of flame kernels 40 become ignition sources and disperse in the combustion chamber 21. And, the fuel-air mixture formed in advance in the combustion chamber is burned instantaneously. Assuming that the injection pressure at this time is 49 MPa, the velocity of the jet flow is about 50 m/s, which is very fast compared with a laminar flow combustion velocity of 0.9 m/s. Further, the turbulent flow velocity is about 20 times the laminar flow combustion velocity, that is, 18 m/s. Also, the jet flow velocity is much faster than the turbulent flow velocity. Accordingly, all the fuel-air mixture in the combustion chamber 21 can be ignited instantaneously and burned. The jet direction of each jet flow A does not change spatially in each engine cycle and it is stable; therefore, the thermal efficiency does not lower.

Further, in FIG. 11, when the scale of each of the flame kernels 40 becomes 1 mm or larger, a heat generation amount accompanied by the combustion of the fuel-air mixture in the vicinity becomes more than the amount of heat dissipation to the surrounding area through heat transmission, so that the flame kernel 40 grows and does not extinguish. Accordingly, the diameter of each hole 20 of the flame nozzle 30 mounted around the injection port of the fuel injection valve 2 is made 1 mm or more, whereby the scale of the flame kernel 40 is made 1 mm or larger, and the flame kernel 40 is expanded and prevented from extinguishing.

For fuel, such as diesel fuel, which is apt to auto-ignite, sprayed fuel is apt to self-ignite, and changes in each engine cycle, as in conventional diesel engines. In order to avoid this, the compression ratio in the combustion chamber 21 is made 20 or less, while the compression ratio of the diesel engine is 20 or more, whereby auto-ignition is suppressed.

Fuel having an octane number which is low is apt to auto-ignite and cause knocking; however, in the present invention, since the ignition sources are dispersed to various points in the combustion chamber 21, the combustion is completed before the auto-ignition, so that knocking is prevented.

When the combustion is too fast, excessive force is applied on the piston 15 and cylinder 17. In order to avoid this, the concentration of the fuel-air mixture in the flame nozzle the 30 and ignition timing are controlled according to the operation conditions to achieve an optimum combustion speed.

Further, it is preferable that the flame nozzle 30 is made of low heat conductive material, such as a ceramic which does not need to be cooled when the high temperature combustion gas H passes through the holes 20.

Figure 2A:
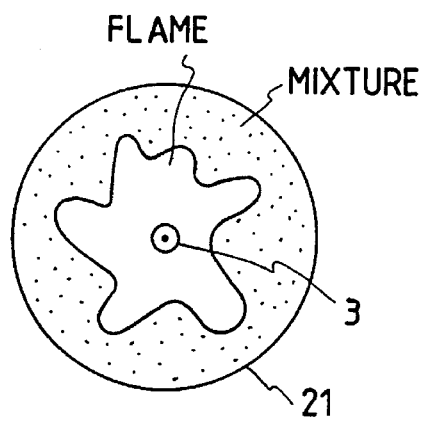
FIGS. 2a to 2f each are a schematic diagram of combustion conditions that occur inside of the combustion chamber 21, as viewed from an upper side, showing examples of combustion conditions of prior combustion methods.
Figure 2B:
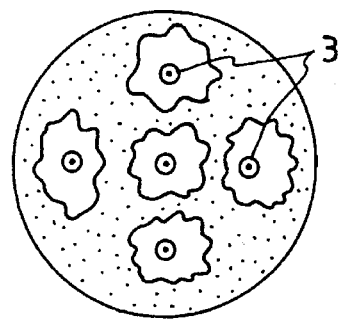
Figure 2C:
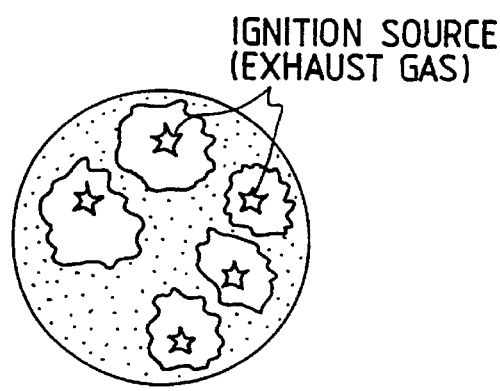
Figure 2D:
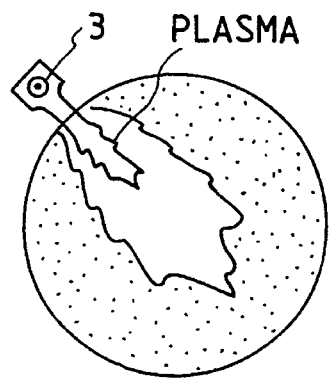
Figure 2E:
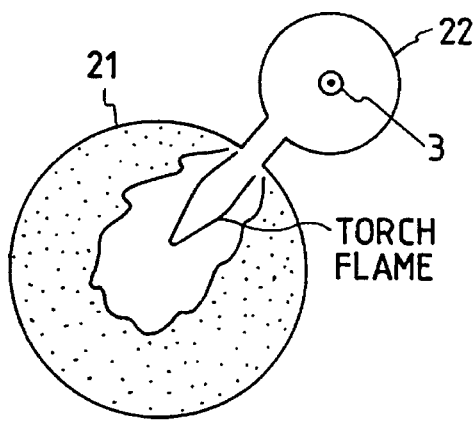
Figure 2F:
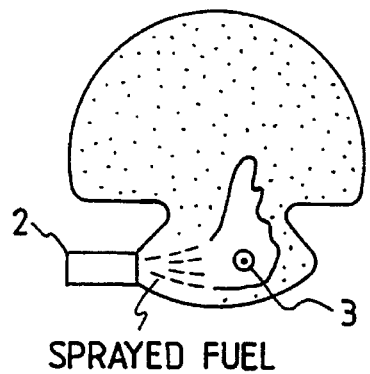
Figure 3A:
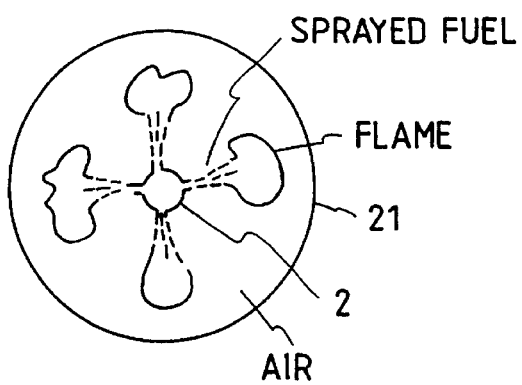
FIGS. 3a to 3f each are a schematic diagram of combustion conditions that occur inside of the combustion chamber 21, as viewed from an upper side, showing examples of combustion conditions of prior auto-ignition combustion methods.
Figure 3B:
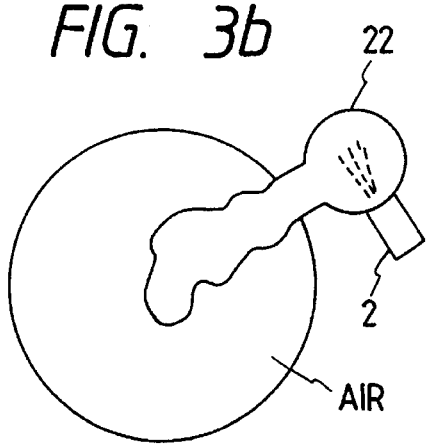
Figure 3C:
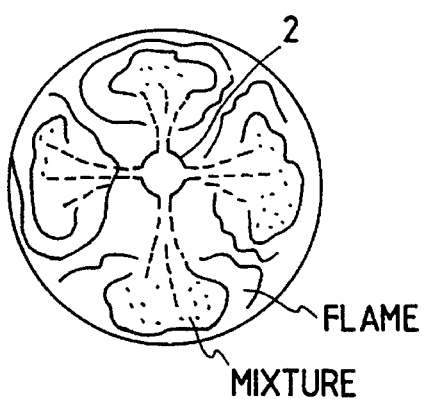
Figure 3D:
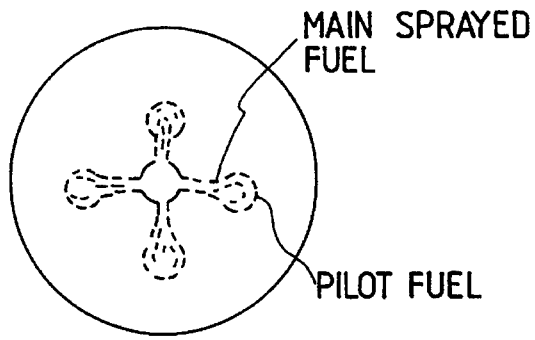
Figure 3E:
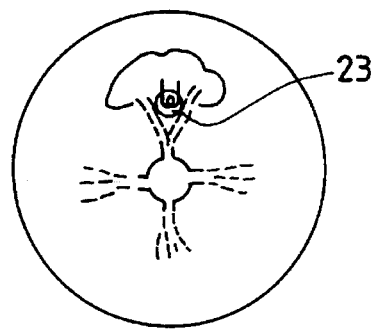
Figure 3F:
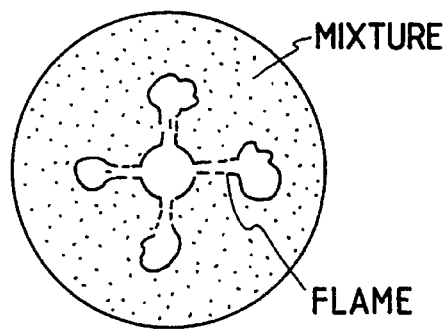
Figure 13:
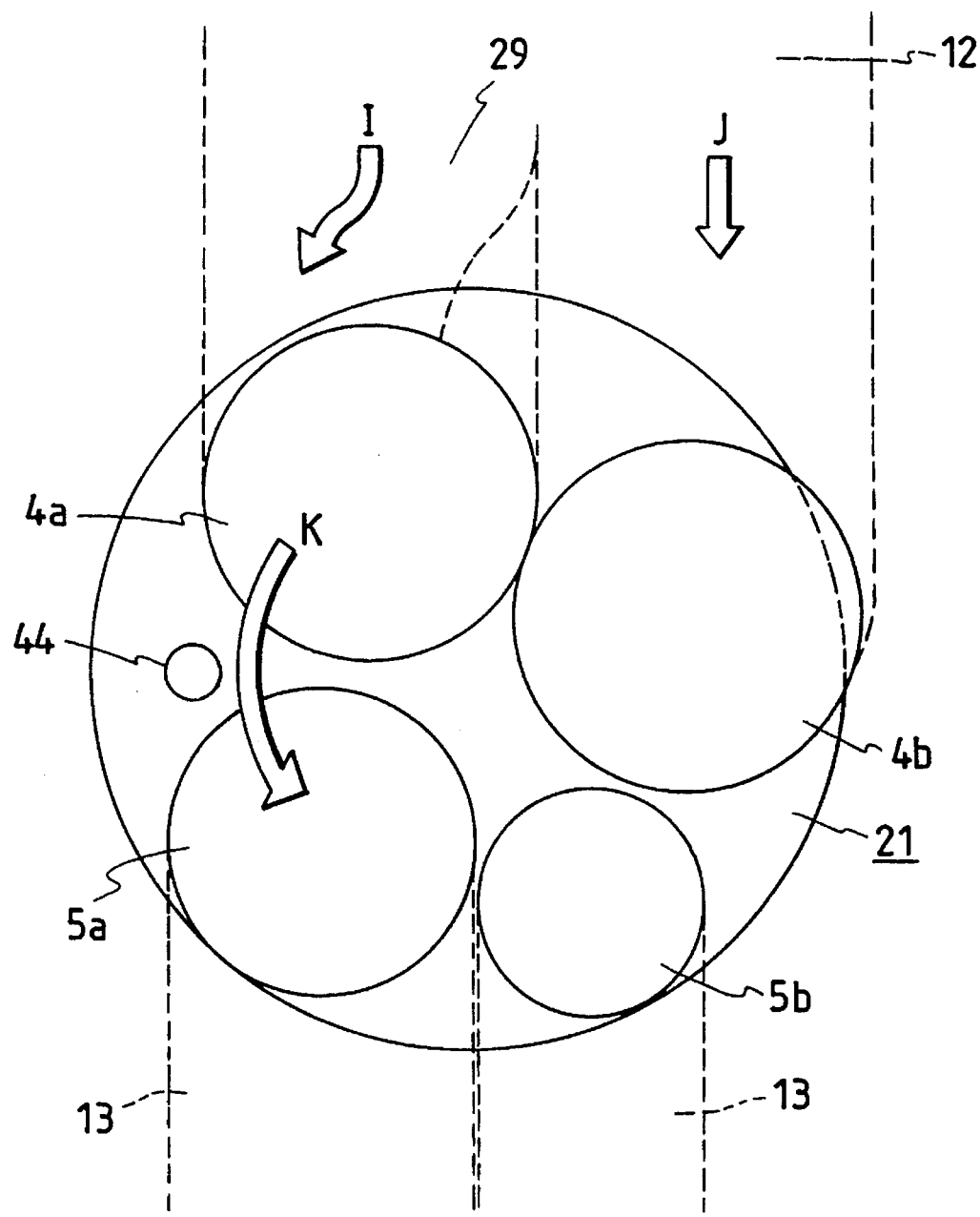
FIG. 13 is a schematic diagram of the air flow direction inside of the combustion chamber 21, as viewed from an upper side of the chamber, showing a third embodiment of the invention.

FIGS. 13 to 16 show a third embodiment of the invention. FIG. 13 is a schematic diagram showing the air flow direction viewed from an upper side of the inside of a combustion chamber 21. The embodiment is a method in which a swirl of intake air is formed in the combustion chamber 21 of a cylinder 17, so that each of the flame kernels 40 is carried on the swirl and dispersed. The flame kernels 40 can be formed by providing the spark plug 3 around the fuel-air mixture near the jet flow injected from the fuel injection valve 2, discharging it to form flame kernels 40, and carrying the flame kernels 40 on the swirl to disperse them in the combustion chamber 21, as shown in FIG. 1. However, if a fuel injection valve 44 having an electrode in which the fuel injection valve 2 and the ignition valve 3, as in FIG. 1, are integrated into one unit is used, even a small space is sufficient for mounting it, and it can be positioned at a suitable place for ignition. Further, in this embodiment, a part of the jet flow of fuel has an effect to make movement of the swirl faster and to rapidly disperse the flame kernels 40, so that the flame kernels 40 can be dispersed rapidly in the combustion chamber 21. Therefore, the occurrence of soot, as in the conventional method exemplified in FIG. 2f can be prevented.

In FIG. 13, two intake valves 4a, 4b are arranged in the combustion chamber 21. The air flow I passing through the intake valve 4a includes a component of swirl and forms swirl K in the combustion chamber 21. The air flow J passing through the intake valve 4b does not include any swirl component, and the intake valve 4b is opened when the engine rpm is at a high speed and is closed otherwise. As mentioned above, since the integrated ignition and fuel injection valve 44, as mentioned above, is sufficiently compact to be accommodated in a small space it can be mounted near the intake valve 4a of the combustion chamber 21, and as a result, the flame kernels 40 can be surely carried on the swirl K so as to be dispersed.

Reference numbers 5a, 5b in FIG. 13 denote exhaust valves, respectively, each of which is provided for an exhaust pipe 13. References numerals 12 and 29 denote an intake pipe and a swirl intake port, respectively.

Figure 14:
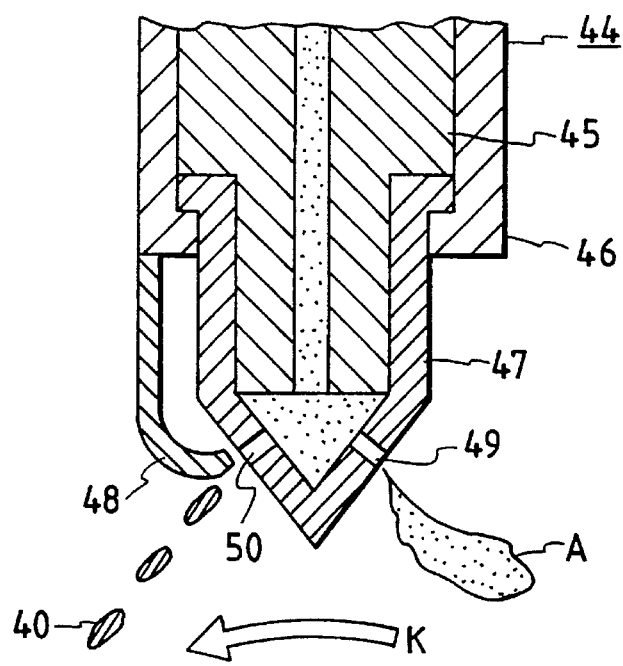
FIG. 14 is a vertical sectional view of a nozzle portion of a fuel injection valve.

In FIG. 14, a vertical sectional view of the nozzle portion of the integrated ignition and fuel injection valve 44 is shown. The nozzle portion comprises an injection port nozzle 45, an electrical insulator 46, a tip electrode 47, an electrode 48, a hole 49 and a hole 50. A jet flow A of fuel injected from the hole 49 is dispersed in all the space in the combustion chamber 21 by the swirl K to form a fuel-air mixture. A high voltage is applied to the electrode 48 at the time when the fuel-air mixture is formed to cause an electrical discharge between the tip electrode 47 and the electrode 48, whereby fuel passing through the hole 50 is burned partially by the discharge to become flame kernels 40, which are dispersed as ignition sources in all the space in the combustion chamber 21 by the swirl K and instantaneously burn the fuel-air mixture previously formed in the chamber.

Figure 15:
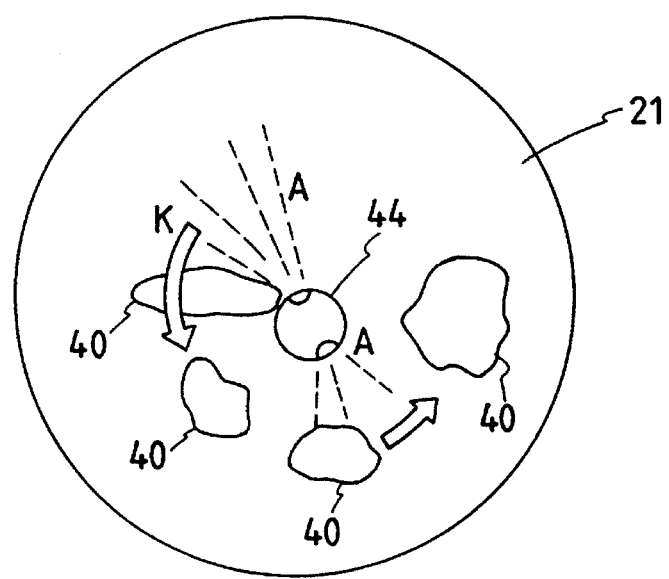
FIG. 15 is a schematic diagram of combustion conditions that occur inside of the combustion chamber 21, as viewed from an upper side of the chamber.

Timing of fuel injection and ignition may be controlled according to engine rpm, load and conditions of the swirl. FIG. 15 is a schematic diagram of combustion conditions as viewed from an upper side of the inside of the combustion chamber 21. A difference from the embodiment shown in FIG. 9 is that the duration time of discharge of the electrode 48 is longer, whereby a plurality of flame kernels 40 can be formed, as shown in FIG. 15. Further, a plurality of similar flame kernels 40 can be formed even by intermittently discharging the electrode 48.

Figure 16:
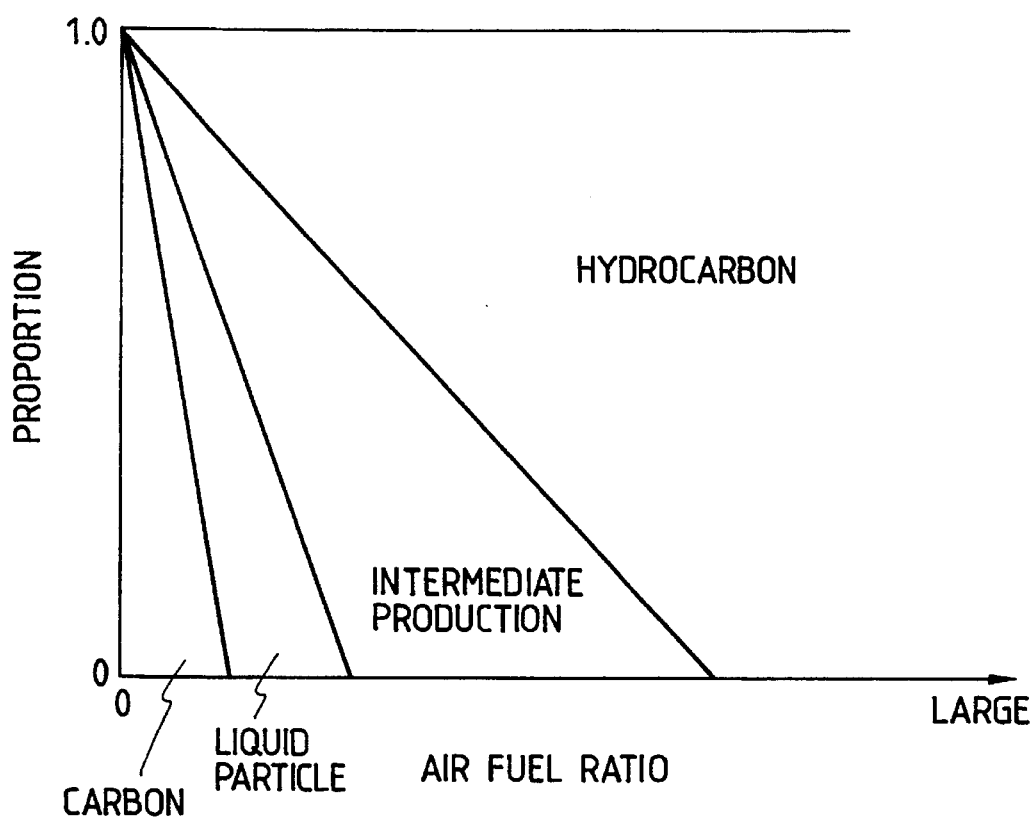
FIG. 16 is a diagram showing a relationship between air fuel ratio and the structure of an ignition source.

FIG. 16 is a diagram showing the relationship between an air fuel ratio and a structure of the ignition source. The ignition source in each embodiment shown in FIGS. 1 and 11 is, as mentioned above, a body of high temperature gas, the main component of which is carbon dioxide when the air fuel ratio is large, a body of an intermediate combustion product, that is, an active gas, or a body of the active gas including therein fuel liquid particles when the air fuel ratio is small. Further, when the air fuel ratio is small and the temperature is high, the ignition source is a body including a decomposition product of the fuel, such as carbon. Since compositions of each body differ according to the air-fuel ratio, it is desired to determine the air-fuel ratio according to the operation conditions.

Further, in this embodiment, an air swirl is used. However, tumbling can be used instead of the swirl, and both the swirl and tumbling can be used together.

Figure 17A:
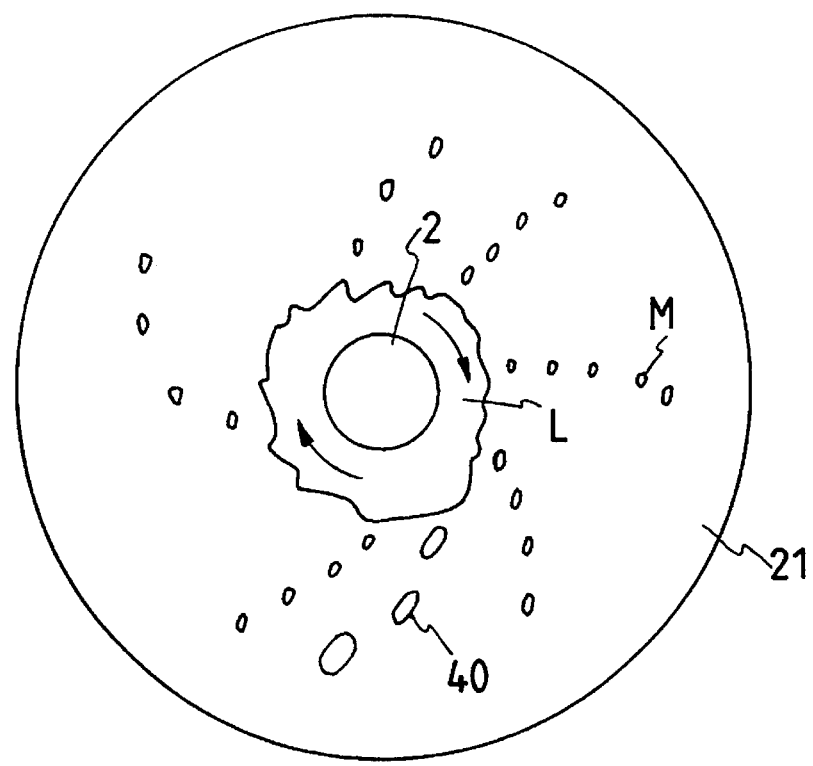
FIGS. 17a and 17b each are a schematic diagram of combustion conditions that occur inside of the combustion chamber 21, as viewed from an upper side of the chamber, showing a fourth embodiment of the invention.
Figure 17B:
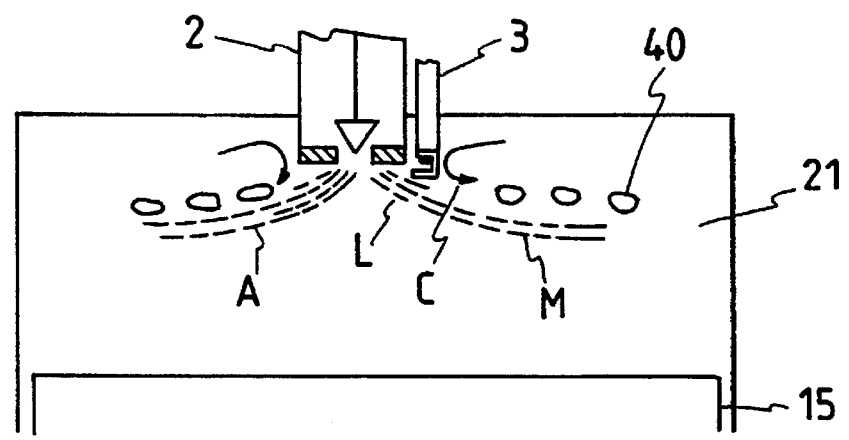

FIGS. 17a and 17b show a fourth embodiment of the present invention.

A thin film-like jet flow L is formed by utilizing a circulating force, a centrifugal force, etc., as shown in FIGS. 17a, 17b in addition to the multi hole nozzle as shown in FIG. 8, 12, etc., to form secondary flows C to disperse fuel like jet flows M, and this jet flow can be used to carry flame kernels 40 on the secondary flows C and the jet flows M so as to be dispersed. In this case, since the penetration force of the jet flows L is weak, the fuel-air mixture at the central portion of the combustion chamber 21 will become rich. The flame kernels 40 are formed by a spark plug 3 arranged near a fuel injection valve 2, as shown in FIG. 17b, and are dispersed by the secondary flows C of the jet flow L.

Figure 18:
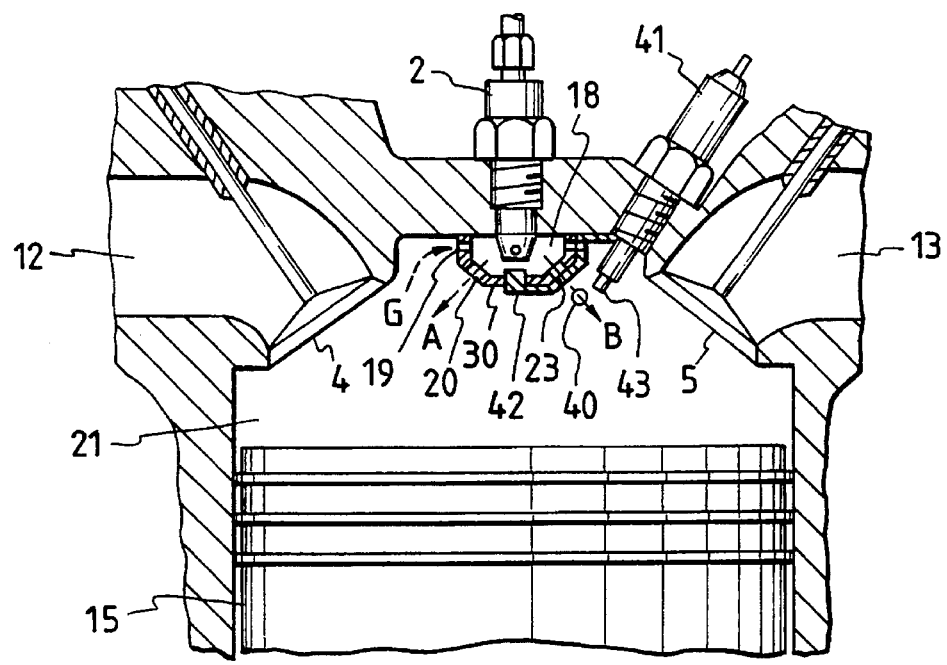
FIG. 18 is a vertical sectional view of a combustion chamber formed in an upper portion of one cylinder of an engine, showing a fifth embodiment of the invention.

FIG. 18 shows a fifth embodiment of the invention. FIG. 18 is a vertical sectional view of a combustion chamber 21 of formed in an upper portion of a cylinder of an engine, as in FIG. 1. In this embodiment, a cylinder inside pressure sensor 41 is provided near a flame nozzle 30 having mounted therein a fuel injection valve 2, and flame kernel 40 is formed by an electrical discharge generated between an electrode 42 provided on the flame nozzle 30, used in place of a spark plug, and an electrode 43 provided at the tip of the cylinder inside pressure sensor 41.

A jet flow A of fuel injected from the fuel injection valve 2 is directly supplied into the combustion chamber 21 through a hole 20 of the flame nozzle 30 to form a fuel-air mixture in the combustion chamber 21. A jet flow B only passes through a hole 23 in a similar manner to the jet flow A. However, then, flame kernel 40 is formed by the electrical discharge between the electrode 42 provided on the flame nozzle 30 and the electrode 43 provided at the tip of the cylinder inside pressure sensor 41, the flame kernel is dispersed in the combustion chamber 21 by energy of the jet flow B, and the fuel-air mixture is ignited instantaneously and burned. A hole 19 is provided at an upper root portion of the flame nozzle 30, and fresh air G in the combustion chamber 21 is supplied into a chamber 18, so that the jet flow A and the jet flow B from the chamber 18 can be formed into an ignitable fuel-air mixture in the combustion chamber 21.

Figure 19:
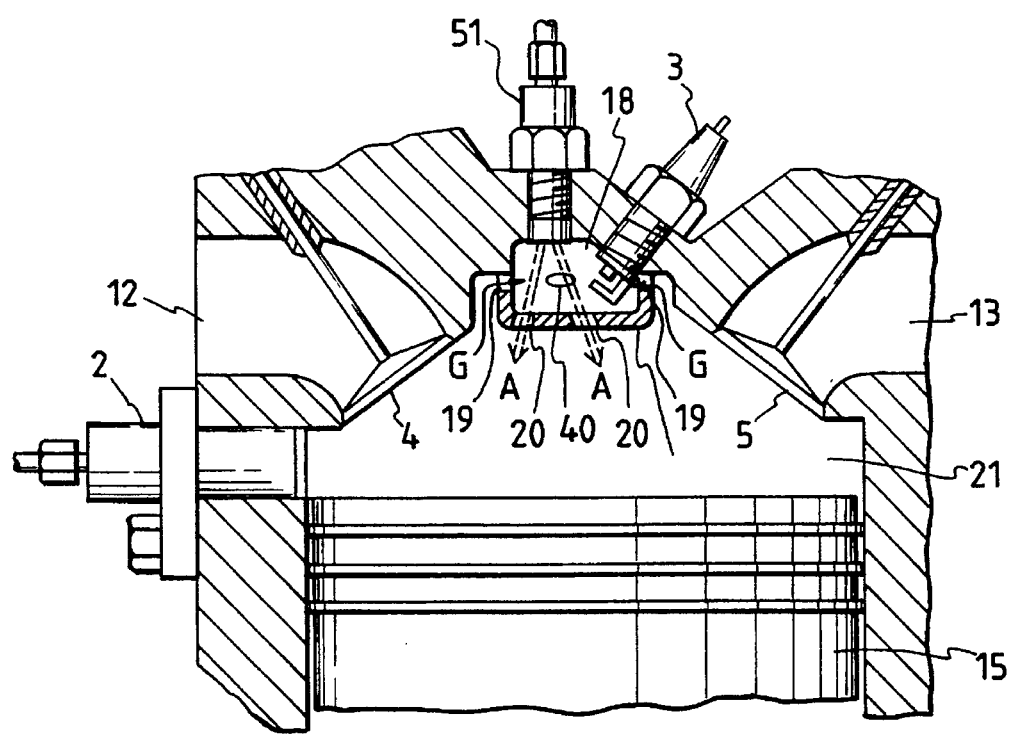
FIG. 19 is a vertical sectional view of a combustion chamber formed in an upper portion of one cylinder of an engine, showing a sixth embodiment of the invention.

FIG. 19 shows a sixth embodiment of the invention. FIG. 19 is a vertical sectional view of a fuel injection valve 21 formed in an upper portion of a cylinder of an engine. In this embodiment, an auxiliary fuel injection valve 51 only for forming a flame kernel 40 is provided. First, fuel is injected from a main fuel injection valve 2 to form a uniform fuel-air mixture in the combustion chamber 21. Next, fuel is injected into a chamber 18 from the auxiliary fuel injection valve 51, and a fuel-air mixture of the fuel and fresh air G from the combustion chamber 21 is formed in a chamber 18. A spark plug 3 ignites the fuel-air mixture in the chamber 18 to cause it to burn, thereby to form combustion gas. At this time, since the jet flow A continues to flow and the high temperature combustion gas can not flow out at a stroke toward the combustion chamber 21, the gas is torn by the jet flow A to form a plurality of flame kernels 40 as ignition sources, which are dispersed in the combustion chamber 21 and burn instantaneously the fuel-air mixture in the combustion chamber 21.

Figure 20:
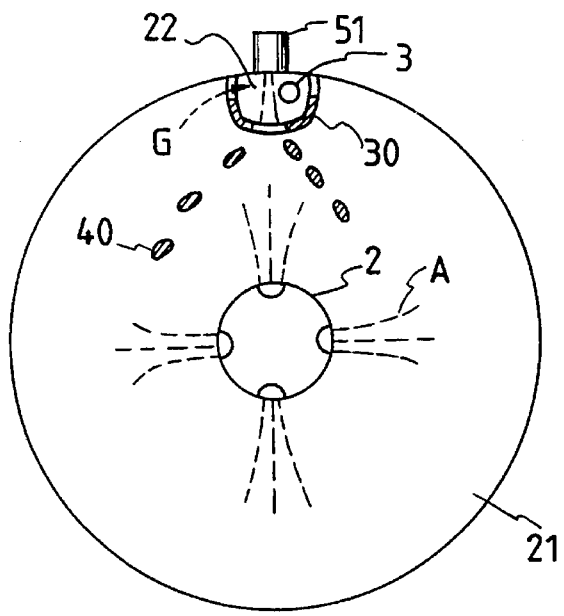
FIG. 20 is a schematic diagram of combustion conditions that occur inside of the combustion chamber 21, as viewed from an upper side of the chamber, showing a seventh embodiment of the invention.

FIG. 20 shows a seventh embodiment of the present invention. FIG. 20 is a schematic diagram of the inside of the combustion chamber 21 viewed from an upper side thereof. In this embodiment, an auxiliary chamber 22 formed of a flame kernel nozzle 30 is provided on a side of the combustion chamber 21, and an auxiliary fuel injection valve 51 and a spark plug 3 are provided inside the auxiliary chamber 22, thereby to form flame kernels 40 in the auxiliary chamber 22. A main fuel injection valve 2 is provided inside the combustion chamber 21. The flame kernel 40 expands inside the combustion chamber with the energy of the jet flow from the auxiliary chamber 22, and is dispersed in the combustion chamber 21 by the jet flow A. In the example shown in FIG. 2b, the torch flame is injected from the auxiliary chamber into the combustion chamber; however, in this embodiment of the present invention, both the flame kernel and the fuel-air mixture are injected from the auxiliary chamber 22 into the combustion chamber 21, and so the energy of the jet flow from the auxiliary chamber 22 is used for dispersing the flame kernels 40, producing a dispersion speed which is very fast.

Fresh air G enters the auxiliary chamber 30 at holes provided at the root portion of the auxiliary chamber 30 so as to be mixed with the fuel injected by the auxiliary injection valve 51.

Figure 21:
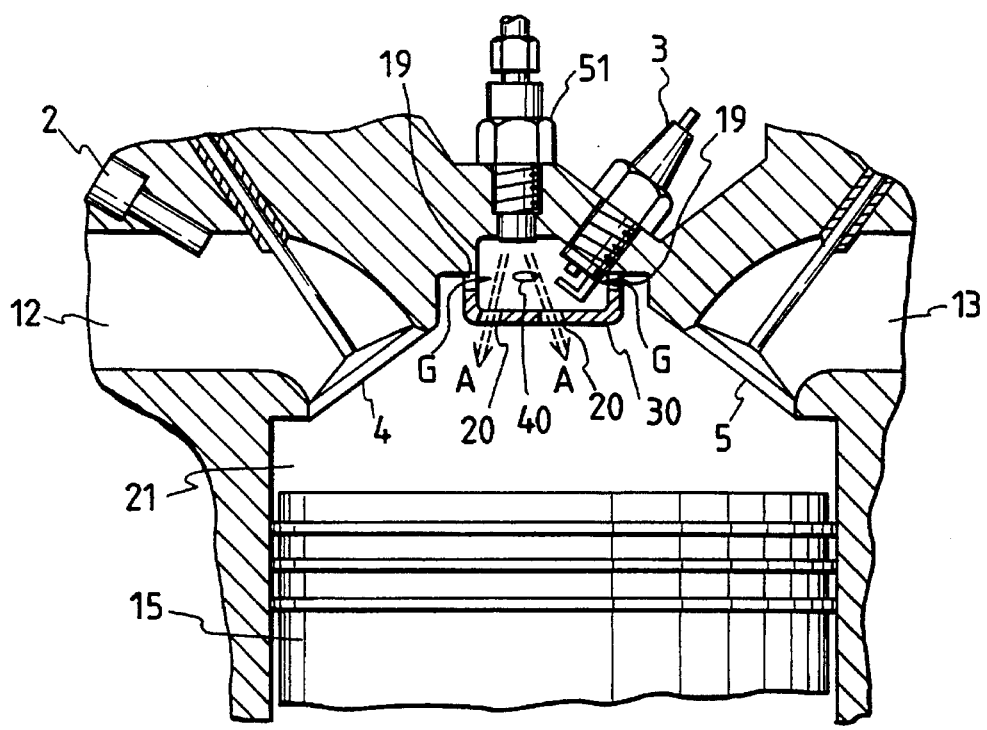
FIG. 21 is a vertical sectional view of a combustion chamber formed in an upper portion of one cylinder of an engine, showing an eighth embodiment of the invention.

FIG. 21 shows an eighth embodiment of the invention. FIG. 21 is a vertical sectional view of a combustion chamber 21 formed in an upper portion of a cylinder of an engine. In this embodiment, a main fuel injection valve 2 is provided in an intake pipe 12, and a main fuel supply is injected into the intake pipe 12 to supply the combustion chamber 21 with fuel. First, when the intake valve 4 is opened, fuel is injected from the main fuel injection valve 2 to form uniform fuel-air mixture in the combustion chamber 21. Next, fuel is injected from an auxiliary fuel injection valve 51 in a similar manner to the case in FIG. 11 to form, in a chamber 18, a mixture of the fuel and fresh air G from the combustion chamber 21 through holes 19. An ignition valve 3 ignites the fuel-air mixture in the chamber 18, and burns it to produce high temperature gas. At this time, since jet flows A continue to flow, and the high temperature gas can not flow out at a stroke toward the combustion chamber 21 through holes 20, the gas is torn by the jet flows A to form a plurality of flame kernels 40 which serve as ignition sources. The flame kernels 40 are dispersed in the combustion chamber 21 to burn instantaneously the fuel-air mixture in the combustion chamber 21.

As mentioned above, in accordance with the invention, the methods of forming flame kernels are:

(a) Ignition is started midway during fuel injection, the discharge duration time is lengthened, and a plurality of flame kernels are formed;

(b) A fuel-air mixture of a certain volume is burned in the auxiliary chamber to form a high temperature combustion gas, and the combustion gas is torn by the jet flow to form a plurality of flame kernels.

Any one of the above methods maybe used to form flame kernels, and the method of dispersing the flame kernels is at least one of the following methods:

(1) The flame kernels are carried on secondary flows of the fuel-air mixture formed at areas surrounding the jet flows, whereby the flame kernels are dispersed;

(2) The flame kernels are carried on swirls or tumbles in the cylinder, whereby the flame kernels are dispersed; and (3) The flame kernels are carried on jet flows of the fuel-air mixture, whereby they are dispersed.

As mentioned above, according to the invention, there can be provided a fuel injection and ignition apparatus for an internal combustion engine and a method thereof which can reduce, without using a plurality of plugs, any significant change in the combustion cycle and any spatial change, which are defects in the prior combustion methods, and produce an instantaneous burn of a lean fuel-air mixture. As a result, the compression ratio can be raised, the thermal efficiency improved, and the fuel consumption efficiency improved because of a use of a lean fuel-air mixture.

What is claimed is:

1. A method of effecting fuel injection and ignition in an internal combustion engine, having a fuel injection valve with an injection port opened within a combustion chamber of the internal combustion engine, said method comprising the steps of:

injecting fuel into said combustion chamber using said fuel injection valve for a determined injection period so that at least one part of the injected fuel passes near said ignition source and at least one other part of the injected fuel passes into and is dispersed in said combustion chamber; and igniting a fuel-air mixture formed by said one part the injected fuel passing near said injection source, using said ignition source, for a limited period of time during the fuel injection to form flame kernels; and dispersing said flame kernels into a fuel-air mixture formed by said at least one other part of said injected fuel dispersed within said combustion chamber using injected fuel.

2. A method of effecting fuel injection and ignition in an internal combustion engine according to claim 1, wherein said flame kernels are carried on secondary flows of fuel-air mixture formed around the jet flow produced by the fuel injection.

3. A method of fuel injection and ignition of an internal combustion engine according to claim 1, further including the step of:

forming at least one of a swirling flow and a tumbling flow in a flow of air introduced into said combustion chamber;

wherein said flame kernels are forming a flame kernel by arranging the ignition source for the fuel-air mixture at such a place that the flame kernel is created and carried on the at least one of the swirling flow and the tumbling flow.

4. A method of effecting fuel injection and ignition in an internal combustion engine, having a fuel injection valve with an injection port opened within a combustion chamber of the internal combustion engine, said method comprising the steps of:

injecting fuel into said combustion chamber using said fuel injection valve for a determined injection period to disperse in said combustion chamber;

igniting a fuel-air mixture near said injection port of said fuel injection valve using an ignition source to create flame kernels adjacent said ignition source; and continuing the fuel injection effected by said fuel injection valve after the operation of said ignition source is terminated to cause said flame kernels to be dispersed throughout said combustion chamber by the fuel injection.

5. A method of effecting fuel injection and ignition of an internal combustion engine, having a fuel injection valve with an injection port for igniting fuel into a combustion chamber of the internal combustion engine, said method comprising the steps of:

providing, around the periphery of said injection port of said fuel injection valve, a nozzle which encloses said ignition port, said nozzle being provided with a hole portion through which a jet flow of fuel injected from said fuel injection valve passes into said combustion chamber to disperse fuel in said combustion chamber;

injecting fuel into said nozzle from said injection port and into said combustion chamber through said hole portion in said nozzle using said fuel injection valve;

igniting a fuel-air mixture near said injection port of said fuel injection valve, using an ignition source, for a limited period of time during the fuel injection, to create flame kernels; and dispersing said flame kernels in said combustion chamber using injected fuel.

6. A method of effecting fuel injection and ignition in an internal combustion engine according to claim 5, wherein the diameter of said hole portion of said nozzle is at least 1 mm.

7. A method of effecting fuel injection and ignition of an internal combustion engine, having a fuel injection valve with an injection port for injecting fuel into a combustion chamber of the internal combustion engine, said method comprising the steps of:

providing, around the periphery of said injection port of said fuel injection valve, a nozzle which encloses said injection port and forms an auxiliary chamber, said nozzle being provided with a hole portion through which a jet flow of fuel injected from said fuel injection valve passes from said auxiliary chamber into said combustion chamber to disperse fuel in said combustion chamber;

injecting fuel into the auxiliary chamber formed by said nozzle and from said auxiliary chamber into said combustion chamber using said fuel injection valve;

igniting a fuel-air mixture inside said nozzle using an ignition source to create flame kernels; and continuing the fuel injection effected by said fuel injection valve after the operation of said ignition source is terminated to disperse said flame kernels in said combustion chamber using the fuel injection.

8. Apparatus for effecting fuel injection and ignition in an internal combustion engine, having a fuel injection valve with an injection port which is opened within a combustion chamber of the internal combustion engine, and an ignition source for igniting an air-fuel mixture in said combustion chamber disposed in proximity to said fuel injection valve, said apparatus comprising:

means for controlling the injection of fuel into said combustion chamber, using said fuel injection valve, for a determined injection period to disperse fuel in said combustion chamber; and means for operating said ignition source to effect ignition of a fuel-air mixture near said injection port of said fuel injection valve for a determined ignition period during the fuel injection to create flame kernels;

said fuel injection valve and said ignition source being positioned so that fuel injected from said fuel injection valve is ignited by said ignition source to create said flame kernels at a location where said flame kernels are dispersed throughout said combustion chamber by the fuel injection.

9. Apparatus for effecting fuel injection and ignition in an internal combustion engine, comprising:

a fuel injection valve with an injection port which is opened within a combustion chamber of the internal combustion engine;

an ignition source for igniting an air-fuel mixture in said combustion chamber disposed in proximity to said fuel injection valve so as to create flame kernels by igniting fuel injecting by said fuel injection valve;

means for controlling the injection of fuel into said combustion chamber, by using said fuel injection valve, for a determined injection period so as to disperse fuel in said combustion chamber; and means for operating said ignition source during said injection period to effect ignition of a fuel-air mixture and creation of said flame kernels near said injection port of said fuel injection valve;

said controlling means operating to continue the fuel injection effected by said fuel injection valve after the operation of said ignition source is terminated so as to cause said flame kernels to be dispersed throughout said combustion chamber.

10. Apparatus for effecting fuel injection and ignition in an internal combustion engine, comprising:

a fuel injection valve with an injection port for injecting fuel into a combustion chamber of the internal combustion engine;

a nozzle provided around the periphery of said injection port of said fuel injection valve to define a small chamber within said combustion chamber, said nozzle having hole portions through at least one of which a jet flow of fuel injected from said fuel injection valve passes into the combustion chamber;

an ignition source for igniting an air-fuel mixture in said small chamber;

means for controlling the injection of fuel into said small chamber and said combustion chamber using said fuel injection valve; and means for operating said ignition source to ignite a mixture gas inside said small chamber formed by said nozzle for a determined period during fuel injection.

11. Apparatus of effecting fuel injection and ignition in an internal combustion engine according to claim 10, wherein the diameter of said hole portion of said nozzle is at least 1 mm.

12. Apparatus for effecting fuel injection and ignition in an internal combustion engine, comprising:

a fuel injection valve with an injection port for injecting fuel into a combustion chamber of the internal combustion engine;

a nozzle provided at the periphery of said injection port of said fuel injection valve so as to surround said insertion port, said nozzle having hole portions through at least one of which a jet flow of fuel injected from said fuel injection valve passes into the combustion chamber;

an ignition source for igniting an air-fuel mixture in said nozzle;

means for controlling the injection of fuel into said nozzle and through said at least one portion into said combustion chamber using said fuel injection valve; and means for operating the ignition source to ignite a mixture gas inside said nozzle, said controlling means operating to continue the fuel injection effected by said fuel injection valve after termination of the operation of said ignition source.

13. Apparatus for effecting fuel injection and ignition in an internal combustion engine according to claim 12, wherein flame kernels are created and carried on a secondary flow of the fuel-air mixture formed around the jet flow of fuel injected from said injection port of said fuel injection valve and passing through said at least one hole portion in said nozzle.

14. Apparatus of fuel injection and ignition of an internal combustion engine according to claim 13, further including:

means for forming at least one of a swirling flow and a tumbling flow in a flow of air introduced into said combustion chamber; and wherein said flame kernels are carried out on the at least one of the swirling flow and the tumbling flow.

* * * * *